(12) United States Patent
Grochocinski et al.

(10) Patent No.: US 6,618,191 B2
(45) Date of Patent: Sep. 9, 2003

(54) ENABLER OF LARGE RAMAN GAIN ON SMALL EFFECTIVE AREA FIBERS

(75) Inventors: James M. Grochocinski, Chester (GB); Michael Vasilyev, Belle Mead, NJ (US); Vaidyanathan Srikant, Ithaca, NY (US); James Passalugo, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/845,401

(22) Filed: Apr. 30, 2001

(65) Prior Publication Data

US 2002/0159132 A1 Oct. 31, 2002

(51) Int. Cl.$^7$ ................................................. H01S 3/30
(52) U.S. Cl. ...................................................... 359/334
(58) Field of Search ......................................... 359/334

(56) References Cited

U.S. PATENT DOCUMENTS

| | | | | |
|---|---|---|---|---|
| 6,147,794 A | * | 11/2000 | Stentz ........................ | 359/124 |
| 6,304,368 B1 | * | 10/2001 | Hansen et al. .............. | 359/134 |
| 6,452,716 B1 | * | 9/2002 | Park et al. .................. | 359/334 |
| 2001/0019448 A1 | * | 3/2001 | Yokoyama .................. | 359/334 |

OTHER PUBLICATIONS

Shimizu et al. OFC 2001. Mar. 17–22, 2001.*
Ferreira et al. Electronic Letters. Aug. 15, 1991.*
Miyakava et al. OFC 2001. Mar. 17–22, 2001.*
Dianov et al. ECOC 88. 1988.*
Waarts et al. Proceedings of the IEEE. Aug. 1990.*
Koch et al. OFCC 2000, vol. 4, Mar. 7–10, 2000.*
Lewis et al. Elect. Letts. Jul. 8, 1999, vol. 35, No. 14.*
Hamoir et al. Optical Amplifiers and Their Applications 9–12, 2000 vol. 44.*

K. Motoshima et al; "Dynamic Compensation of Transient Gain Saturation in Erbium–Doped Fiber Amplifiers By Pump Feedback Control", IEEE; Dec. 1993; pp. 1423–1426; vol. 5, No. 12.

A.K. Srivastava et al; "Fast Gain Control in an Erbium–Doped Fiber Amplifier", AT&T Laboratories, Crawford Hill Laboratory; Jul. 1996; pp. 2–5.

M. Karasek et al; "Analysis of Dynamic Pump–Loss Controlled Gain–Locking System for Erbium–Doped Fiber Amplifiers"; IEEE; Aug. 1998; pp. 1171–1173; vol. 10, No. 8.

Yoon et al; "Reference Level Free Multichannel Gain Equalization and Transient Gain Supression of EDFA with Differential ASE Power Monitoring"; IEEE; Mar. 1999; pp. 316–318; vol. 11, No. 3.

Haruo et al; "Automatic Optical Loss Compensation with Erbium–Doped Fiber Amplifier"; IEEE; Aug. 1992; pp. 1110–1116; vol. 10, No. 8.

Richards et al; "A Theoretical Investigation of Dynamic All–Optical Automatic Gain Control in Multichannel EDFA;s and EDFA Cascades"; IEEE; Aug. 1997; pp. 1027–1036; vol. 3, No. 4.

Park et al; "Dynamic Gain and Output Power Control in a Gain–Flattened Erbium–Doped Fiber Amplifier"; IEEE; Jun. 1998; pp. 787–789; vol. 10, No. 6.

Takahashi et al; "An output Power Stabilized ErbiumDoped Fiber Amplifier with Automatic Gain Control"; IEEE; Aug. 1997; pp. 1019–1026; vol. 3, No. 4.

(List continued on next page.)

Primary Examiner—Thomas G. Black
Assistant Examiner—Stephen Cunningham
(74) Attorney, Agent, or Firm—Andrew E. Rawlins; Svetlana Z. Short

(57) ABSTRACT

An apparatus for transporting an optical signal is provided comprising at least two sections of optical fiber, a directional wavelength selector positioned between the at least two sections of optical fiber wherein the directional wavelength selector selectively blocks wavelengths propagating in a reverse direction, and a pump light emitting device optically coupled to the optical fiber.

40 Claims, 4 Drawing Sheets

OTHER PUBLICATIONS

Landousies et al; "Low Power Transient in Multichannel Equalized and Stabilized Gain Amplifier Using Passive Gain Control"; Electronics Letters; Sep. 1996; pp. 1912–1913; vol. 32; No. 20.

Michael Yadlowsky; "Independent Control of EDFA Gain Shape and Magnitude Using Excited–State Trapping"; IEEE; May 1999; pp. 539–541; vol. 11, No. 5.

Desurvire et al.; "Dynamic Gain Compensation in Saturated Erbium–Doped Fiber Amplifiers"; IEEE; May 1991; pp. 453–455; vol. 3, No. 5.

Desurvire; "Erbium–Doped Fiber Amplifiers"; Principles and Applications; pp. 469–488.

Giles et al; Modeling Erbium–Doped Fiber Amplifiers; IEEE; Feb. 1991; pp. 271–283; vol. 9, No. 2.

* cited by examiner

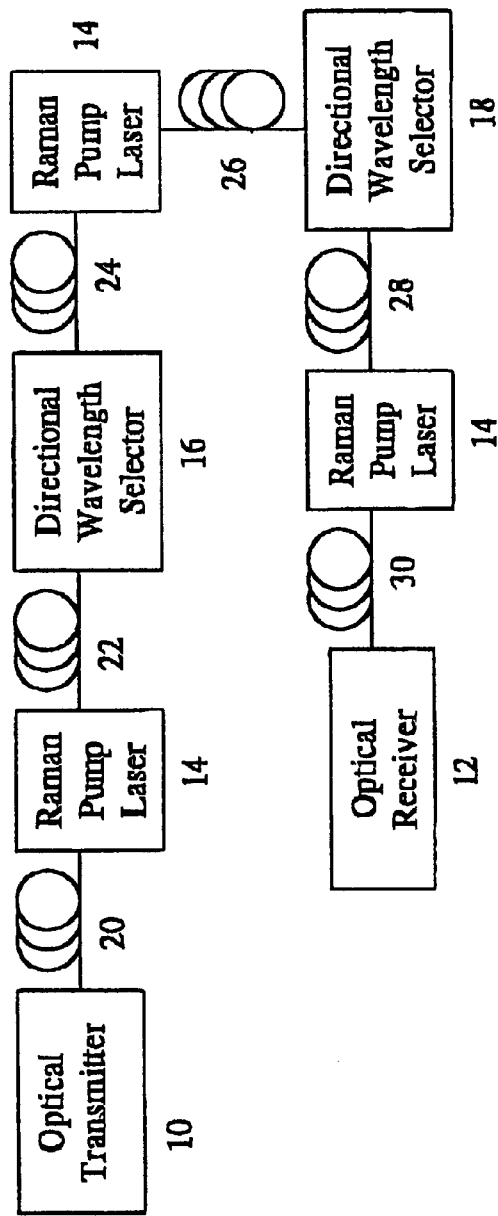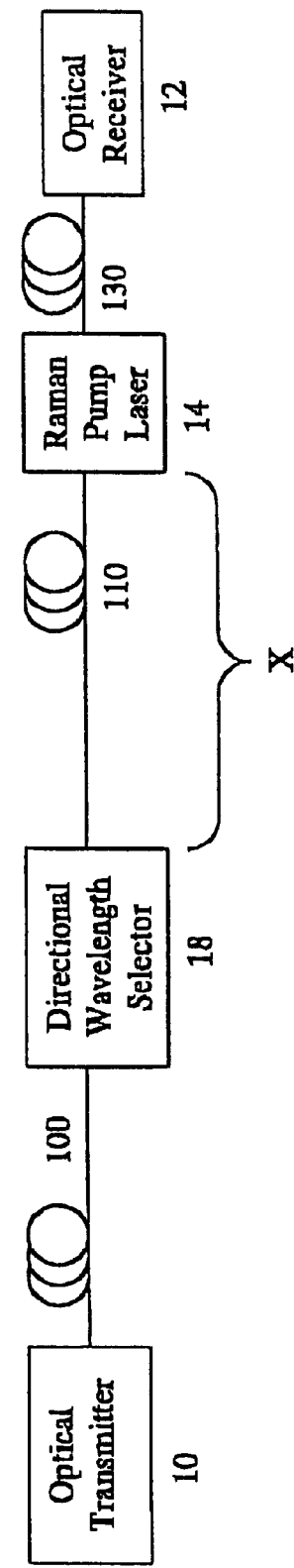

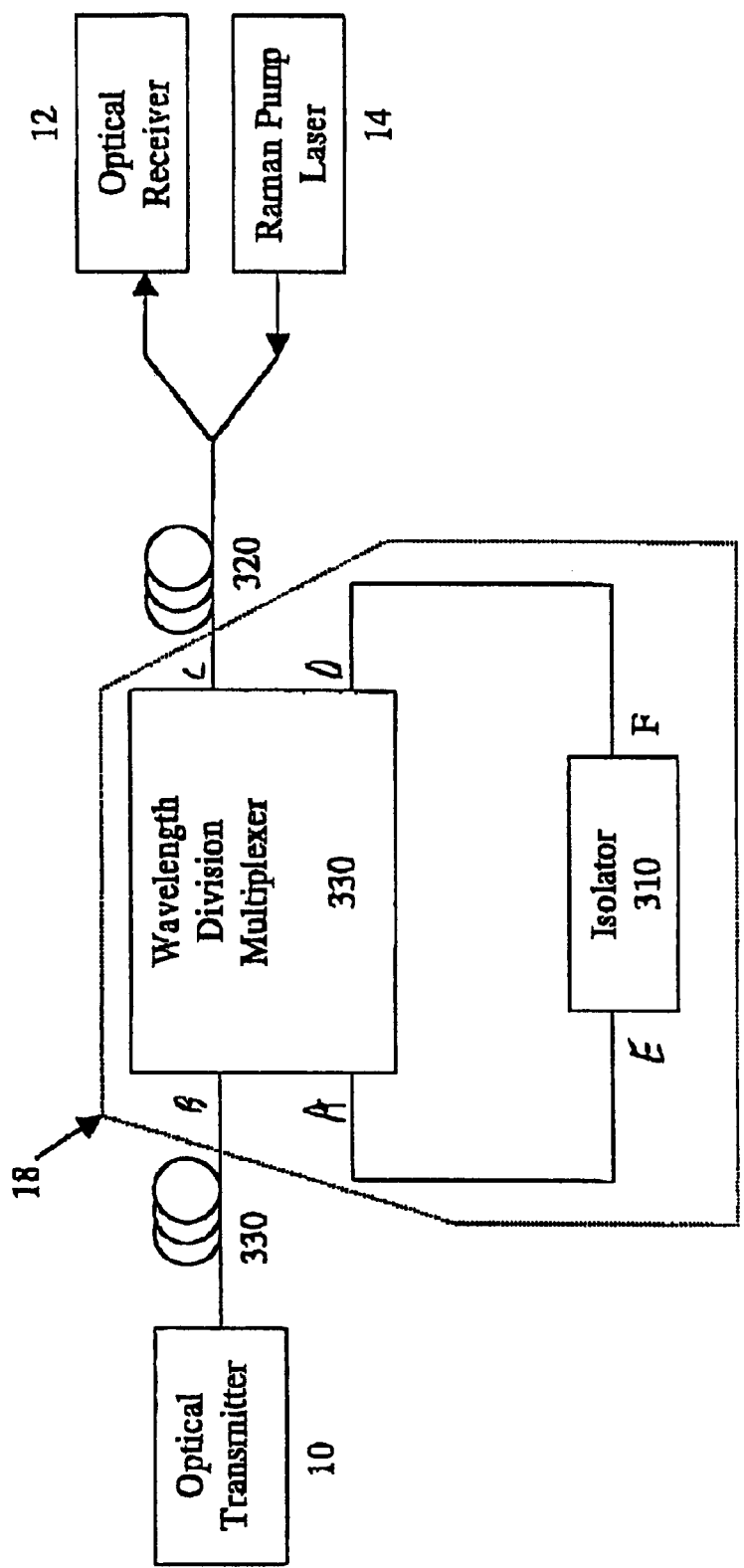

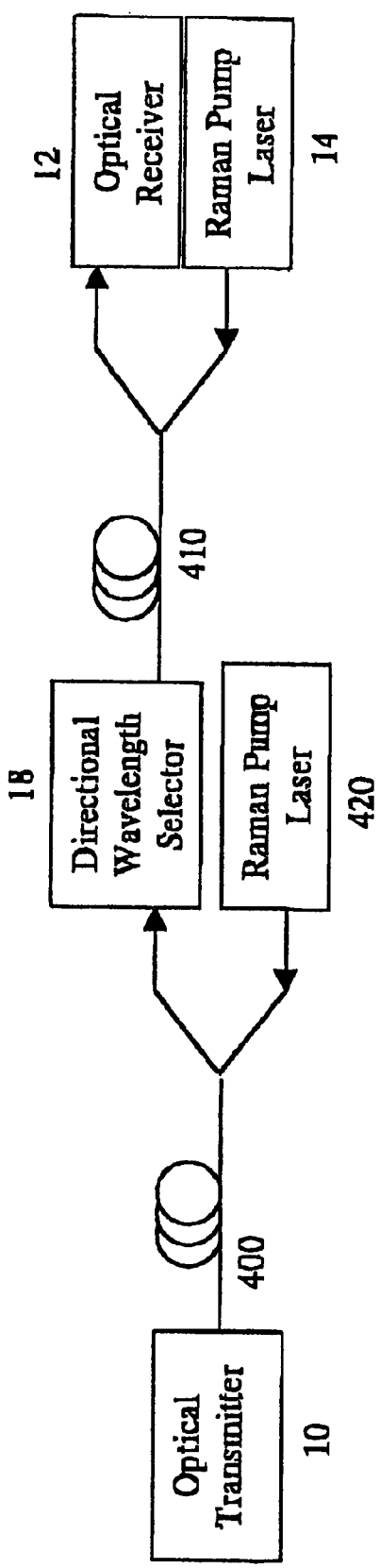

ENABLER OF LARGE RAMAN GAIN ON SMALL EFFECTIVE AREA FIBERS

BACKGROUND OF THE INVENTION

A. Field of the Invention

The invention relates generally to long-haul optical fiber transmission systems, more particularly, to long-haul systems including optical fiber with Raman amplification.

B. Background of the Invention

Signal degradation encountered when transmitting optical signals over long-haul optical fiber has greatly increased the need for improved optical signal amplification devices along the transmission path. Specifically, long-haul optical signal amplification presently suffers from amplification of noise along with the optical signal, resulting in a degraded signal to noise ratio (SNR) at the receiving node.

Presently, one method of long-haul signal amplification is achieved by utilizing a Raman amplification scheme. Raman amplification utilizes a pump laser optically coupled to the receiving node. The Raman pump laser provides an amplification signal propagating along the transmission path in a direction opposite the optical signal. As the amplification signal travels along the transmission path, energy is gradually transferred from the amplification signal to longer wavelengths of the optical signal through stimulated Raman scattering.

The power of the amplification signal is greatest near the output node of the long-haul optical transmission system where the pump laser inputs to the optical cable. Optical intensity of the amplification signal can be represented by the equation: $P_{intensity} = (\text{Laser Light Power}/A_{eff})$, where $A_{eff}$ is the effective cross sectional area of the fiber.

Slope compensating optical fiber (SCF) is used in a section of optical fiber to compensate for the difference in dispersion at different wavelengths of the optical signals transmitted in single mode fiber (SMF). SCF also has a small $A_{eff}$ when compared to other forms of optical fiber used for optical signal transmission, such as SMF. The small $A_{eff}$ results in higher pump laser intensity which results in greater amplification of the transmitted optical signal.

Signal power going through transmission fiber is attenuated at the rate of about 0.1 dB/km to about 2 dB/km and, typically, of about 0.2 dB/km. Amplification signal power tends to degrade at an approximate rate of 0.25 db per 1 km of SCF optical fiber as it travels along the long-haul optical transmission system. Further, the minimum absolute dispersion of a particular wavelength of all of the wavelengths is typically in the range of 0 to 300 ps/nm. SCF optical fiber is utilized, at least partially, so that the difference between the absolute dispersion between the wavelengths is very small.

In Raman amplification, not only is the desired input signal amplified, but ambient noise introduced by a variety of sources as the input signal travels along a section of optical fiber is also amplified, resulting in a degraded SNR at the receiving node. The ambient noise being amplified is at least partially generated by multi-path interference (MPI) from double-Rayleigh back-scattering (DRBS) and Rayleigh back-scattering of amplified spontaneous emission (ASE).

The above mentioned noise degradation is particularly a problem in small $A_{eff}$ fiber such as SCF fiber, primarily because most of the Raman gain occurs in the SCF section of the long-haul optical transmission system. The small $A_{eff}$ of SCF fiber dramatically increases the fraction of Rayleigh back-scattering falling into its propagating mode. This leads to rapid growth of noise with increasing Raman gain. In addition at higher Raman gain, the total amplified signal power at the fiber section output becomes comparable to that of the pump and causes depletion. This, in turn, substantially degrades the Raman noise figure (NF).

The present invention is directed to overcoming or at least reducing the effects of one or more of the problems set forth above.

SUMMARY OF THE INVENTION

The invention relates to improvements in the amplification of the optical signal by substantially reducing or removing wavelengths propagating in a reverse direction.

In a first aspect, an apparatus for transporting an optical signal is provided comprising at least two sections of optical fiber, a directional wavelength selector positioned between the at least two sections of optical fiber wherein the directional wavelength selector selectively blocks wavelengths propagating in a reverse direction, and a pump light emitting device optically coupled to the optical fiber.

In a second aspect, a method of transporting an optical signal is provided comprising the steps of transporting an optical signal via an optical fiber comprising at least two sections of optical fiber, providing an amplification signal propagating in a reverse direction to amplify the optical signal using a pump light emitting device optically coupled to the optical fiber, and preventing pre-selected wavelengths from propagating in a reverse direction using a device positioned between the at least two sections of optical fiber.

In a third aspect, an optical transmission system including optical fiber, the optical transmission system transmitting in a predetermined wavelength range having a substantially central wavelength, is provided the system comprising at least two sections of optical fiber, a directional wavelength selector positioned between the at least two sections of optical fiber, and a pump light emitting device optically coupled to the optical fiber, wherein the directional wavelength selector prevents pre-selected wavelengths from propagating in a reverse direction.

In a fourth aspect, an optical transmission system including optical fiber, the optical transmission system transmitting optical signals in a predetermined wavelength range is provided comprising at least two sections of optical fiber wherein at least one section of the optical fiber comprises small effective area optical fiber, a pump light emitting device optically coupled to one of the sections of optical fiber wherein the pump light emitting device provides an amplification signal along the optical fiber, and a directional wavelength selector positioned between the sections of optical fiber wherein the directional wavelength selector allows the signal wavelengths to only propagate substantially in the forward direction and allows the amplification signal to propagate in the reverse direction.

In a fifth aspect, an apparatus for transporting an optical signal is provided comprising at least two sections of optical fiber, a pump light emitting device optically coupled to one of the sections of optical fiber wherein the pump light emitting device provides an amplification signal along the optical fiber, an optical circulator positioned between the sections of optical fiber comprising at least three ports $T_x$, $R_x$, and $L_x$, and a wave cancellation device positioned at the $L_x$ port of the optical circulator. Signals entering port $R_x$ circulate to port $L_x$, signals entering port $L_x$ circulate to port $T_x$, and signals entering port $T_x$ circulate to port $R_x$. The wave cancellation device reflects the amplification signal back into port $L_x$ and substantially does not reflect other signals emerging from port $L_x$.

In a sixth aspect, a Raman optical signal amplifier is provided comprising an optical fiber comprising a first section of optical fiber and a second section of optical fiber, a directional wavelength selector positioned between the first and second sections of optical fiber wherein the directional wavelength selector allows signal wavelengths to propagate in a forward direction and selectively blocks wavelengths propagating in a reverse direction, and a Raman pump light emitting device optically coupled to the optical fiber for generating an amplification signal. The first section of optical fiber comprises optical fiber with an effective area less than 40 $\mu m^2$. The second section of optical fiber comprises optical fiber with an effective area greater than 50 $\mu m^2$.

Thus, a long-haul optical fiber transmission system consisting of sections of optical fiber with a directional wavelength selector has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

BRIEF DESCRIPTION OF THE DRAWINGS

The foregoing advantages and features of the invention will become apparent upon reference to the following detailed description and the accompanying drawings, of which:

FIG. 1 is a block diagram of a first embodiment of an optical fiber system according to the present invention.

FIG. 2 is a block diagram of a second embodiment of an optical fiber system according to the present invention.

FIG. 4 is a block diagram of a fourth embodiment of an optical fiber system according to the present invention.

FIG. 5 is a block diagram of a fifth embodiment of an optical fiber system according to the present invention.

DETAILED DESCRIPTION OF PREFERRED EMBODIMENTS

Figure 3:
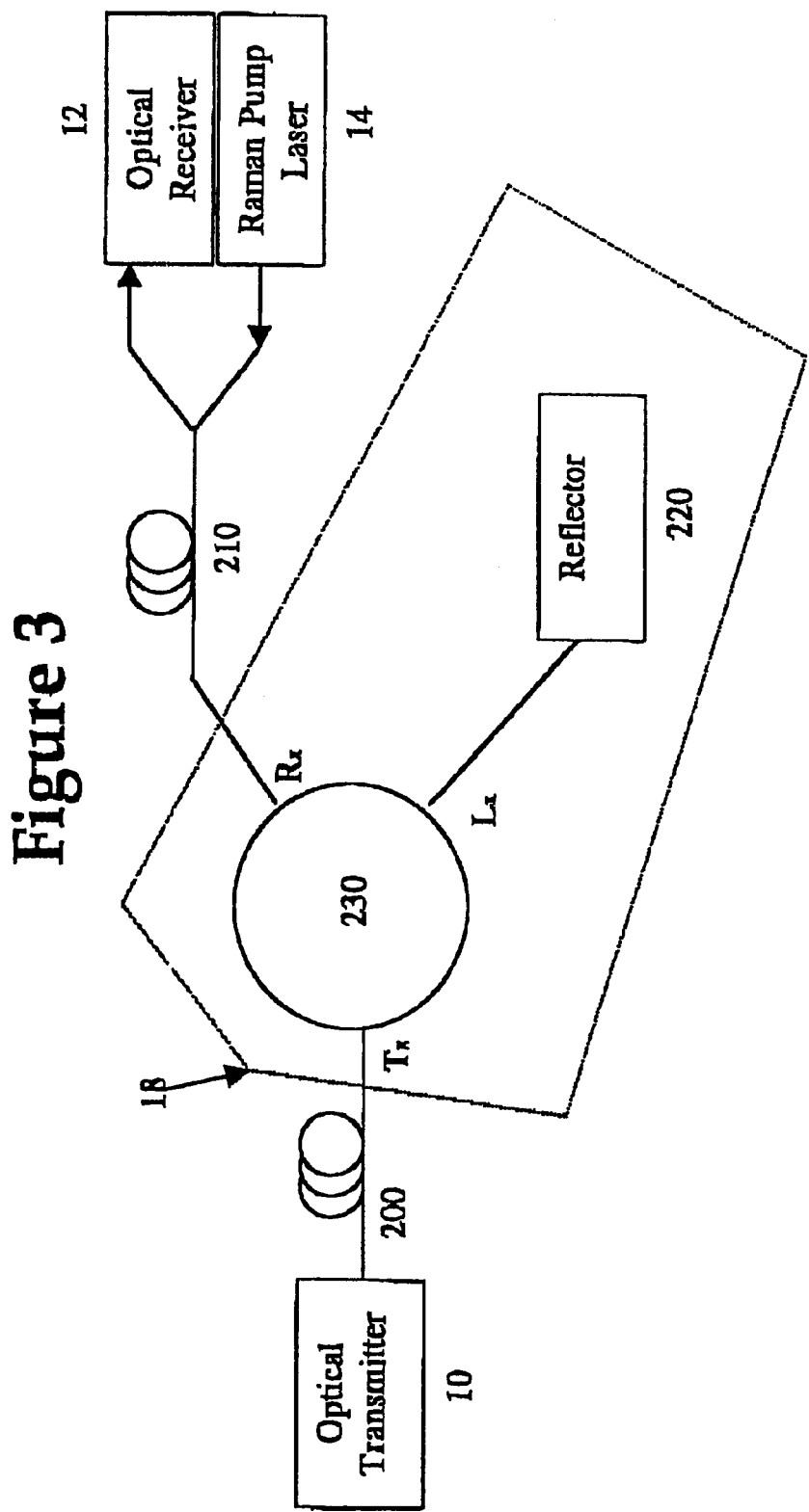
FIG. 3 is a block diagram of a third embodiment of an optical fiber system according to the present invention.

Reference will now be made in detail to presently preferred embodiments of the invention. Wherever possible, the same reference numbers will be used throughout the drawings to refer to the same or like parts.

A first embodiment of an optical fiber transmission system is shown by the block diagram of FIG. 1. Optical transmitter 10 for transmitting an optical signal is shown optically coupled to a section of optical fiber 20. Typical input optical signals generated by the optical transmitter 10 may have a wavelength in the range of 1530 nm to 1620 nm. Optical receiver 12 for receiving an optical signal is shown optically coupled to a section of optical fiber 30. Raman pump lasers 14 for generating amplification signals are shown optically coupled to sections of optical fiber 20, 22, 24, 26, 28 and 30. Typical Raman amplification signals have a wavelength in the range of 1400 nm to 1480 nm. Directional wavelength selectors 16 and 18 are shown optically coupled to sections of optical fiber 22, 24, 26, and 28.

Optical fibers 20, 22, 24, 26, 28 and 30 may comprise different types of optical fiber. Optical fiber 30 may comprise small effective area fiber ($A_{eff}$) with a typical $A_{eff}$ less than 40 $\mu m^2$, for example. Optical fiber 20 may comprise single mode fiber with a typical $A_{eff}$ greater than 50 $\mu m^2$, preferably greater than 80 $\mu m^2$ for example. Further, the number of Raman pump lasers 14 and sections of optical fiber (transmission fiber) 20, 22, 24, 26, 28, and 30 will vary by application.

Directional wavelength selectors 16 and 18 function to reduce the amount of back-scatter signal and allow the amplification signals generated by Raman pump lasers 14 to propagate in a substantially opposite (reverse) direction relative to the optical signal transmitted by optical transmitter 10. As shown, a plurality of Raman pump lasers 14 and directional wavelength selectors 16 and 18 may be incorporated in the optical fiber transmission systems. The number of directional wavelength selectors 16 and 18 may vary by application, such that at least one directional wavelength selector 18 is positioned between two sections of optical fiber 28 and 26.

A second embodiment of an optical fiber transmission system is shown by the block diagram of FIG. 2. Optical transmission fibers 110 and 130 comprise small $A_{eff}$ optical fiber in the range of about 10 $\mu m^2$ to about 40 $\mu m^2$, with a preferred $A_{eff}$ in the range of about 15 $\mu m^2$ to about 40 $\mu m^2$, with a most preferred $A_{eff}$ of about 25 $\mu m^2$. Optical transmission fiber 100 comprises large $A_{eff}$ optical fiber in the range of about 50 $\mu m^2$ to about 200 $\mu m^2$, with a preferred $A_{eff}$ of about 80 $\mu m^2$ to about 120 $\mu m^2$, and a most preferred $A_{eff}$ of about 100 $\mu m^2$. Optical transmitter 10 for transmitting an optical signal is shown optically coupled to a section of optical fiber 100. Optical receiver 12 for receiving an optical signal is shown optically coupled to section of optical fiber 130. Raman pump laser 14 for generating an amplification signal is shown optically coupled to sections of optical fiber 110 and 130. Directional wavelength selector 18, is shown optically coupled at a distance X along a section of optical fiber 110, the last section of optical fiber prior to Raman pump laser 14. The total distance X is typically in the range of 5 to 25 km. In principle, Raman pump laser 14 may be provided in close proximity to optical receiver 12, such that optical fiber 130 may be omitted.

Directional wavelength selector 18 functions to reduce the amount of back-scatter signal and allow the amplification signal generated by Raman pump laser 14 to propagate in a substantially reverse direction, relative to the optical signal transmitted by optical transmitter 10.

A third embodiment of an optical fiber transmission system is shown by the block diagram of FIG. 3. Optical transmission fiber 210 comprises small $A_{eff}$ optical fiber in the range of about 10 $\mu m^2$ to about 40 $\mu m^2$, with a preferred $A_{eff}$ in the range of about 15 $\mu m^2$ to about 40 $\mu m^2$, with a most preferred $A_{eff}$ of about 25 $\mu m^2$. Optical transmitter 10 for transmitting an optical signal is shown optically coupled to optical fiber 200. Optical receiver 12 for receiving an optical signal is shown optically coupled to optical transmission fiber 210. Raman pump laser 14 for generating an amplification signal is shown optically coupled to optical fiber 210. Directional wavelength selector 18, in this embodiment comprising fully recirculating optical circulator 230 as an example, is shown optically coupled to optical fibers 200 and 210.

Fully recirculating optical circulator 230 is shown with ports $T_x$, $R_x$, and $L_x$. Optical light entering port: (1) $T_x$ is circulated to port $R_x$; (2) $R_x$ is circulated to port $L_x$; and (3) $L_x$ is circulated to port $T_x$. Reflector 220 is shown optically coupled to port $L_x$ of fully recirculating optical circulator 230.

Fully recirculating optical circulator 230 operates such that optical signals generated by optical transmitter 10 are transferred to optical receiver 12 without substantial modification. Back-scattered signals and the Raman amplification signal traveling along optical fiber 210 in the reverse direction, enter port $R_x$ of the fully recirculating optical circulator 230 and circulate to port $L_x$. Light circulated to port $L_x$ from $R_x$ enters reflector 220, which reflects the amplification signal back into the fully recirculating optical circulator 230 via port $L_x$, but substantially does not reflect all other wavelengths of light. The amplification signal re-entering via port $L_x$ is then circulated to port $T_x$ where it continues along optical fiber 200 towards optical transmitter 10.

In this third embodiment, fully recirculating optical circulator 230 and Reflector 220 are shown as separate devices. In practice, these devices may be incorporated into a single device, thus forming an example of a directional wavelength selector. Reflector 220 may be implemented as a fiber Bragg grating, or a free space device, for example. Further, optical fibers 200 and 210 may comprise multiple sections of optical fiber with additional Raman pump lasers 14 and/or directional wavelength selectors 18.

A fourth embodiment of an optical fiber transmission system is shown by the block diagram of FIG. 4. Optical fiber 320 comprises small $A_{eff}$ optical fiber in the range of about 10 $\mu m^2$ to about 40 $\mu m^2$, with a preferred $A_{eff}$ in the range of about 15 $\mu m^2$ to about 40 $\mu m^2$, with a most preferred $A_{eff}$ of about 25 $\mu m^2$. Optical transmitter 10 for transmitting an optical signal is shown optically coupled to optical transmission fiber 330. Optical receiver 12 for receiving an optical signal is shown optically coupled to optical transmission fiber 320. Raman pump laser 14 for generating an amplification signal is shown optically coupled to optical fiber 320. Directional wavelength selector 18, in this embodiment comprises a wavelength division multiplexer (WDM) 330 and isolator 310. Wavelength division multiplexer 330 is shown with ports A–D. Isolator 310 is shown with ports E and F, and is optically coupled to wavelength division multiplexer 330 via ports A and D.

In a substantially forward direction, an optical signal entering port B of wavelength division multiplexer 330 propagates to port D where it enters isolator 310 via port F. Isolator 310 substantially propagates all optical wavelengths from port F to port E, which then enter wavelength division multiplexer 330 via port A. Optical signals entering port A of wavelength division multiplexer 330 propagate to port C where they enter optical fiber 320.

In a substantially reverse direction, back-scatter signals and the Raman amplification signals enter wavelength division multiplexer 330 via port C. The Raman amplification signal enters port C and propagates to port B of wavelength division multiplexer 330, where it continues to propagate along optical fiber 330. Back-scatter signals enter port C and propagate to port A, which then enter isolator 310 via port E. Isolator 310 substantially prevents all signals, including back-scatter signals, from propagating from E to F.

In this fourth embodiment, wavelength division multiplexer 330 and isolator 310 are shown as two separate components. In practice, these devices may be incorporated into a single device, thus forming an example of a directional wavelength selector 18. Further, optical fibers 330 and 320 may comprise multiple sections of optical fiber with additional Raman pump lasers 14 and/or directional wavelength selectors 18.

A fifth embodiment of an optical fiber transmission system is shown by the block diagram of FIG. 5. Optical transmitter 10 for transmitting an optical signal is shown optically coupled to a section of optical fiber 400. Optical receiver 12 for receiving an optical signal is shown optically coupled to a section of optical fiber 410. Raman pump laser 14 is shown optically coupled to optical fiber 410. Raman pump laser 420 is shown optically coupled to optical fiber 400. Directional wavelength selector 18 is shown optically coupled to optical transmission fibers 400 and 410.

In this fifth embodiment, directional wavelength selector 18 functions as to reduce the amount of back-scatter signal and allow the amplification signals generated by Raman pump laser 14 to propagate in a substantially opposite direction relative to the optical signal transmitted by optical transmitter 10. Further, Raman pump laser 420 is provided optically coupled to optical fiber 400 in close proximity to directional wavelength selector 18. Raman pump laser 420 provides additional pump power to pre-selected wavelengths that are already present in optical fiber 410. Thus, Raman pump laser 420 may provide additional pump power to an amplification signal generated by Raman pump laser 14.

In a sixth embodiment, an optical fiber transmission system as described in the fifth embodiment is provided with additional features. Only the differences between the fifth and sixth embodiment will be described in detail below.

In this sixth embodiment, Raman pump laser 420 adds a new amplification signal. This may be accomplished by providing an amplification signal at a different wavelength than the amplification signal generated by Raman pump laser 14. Depletion of specific wavelengths may be greater over a shorter distance than other wavelengths. For example, one of the factors that tends to make blue channels have worse NF (noise figure) is the greater depletion of the blue pumps versus other wavelengths over a given distance and as a consequence the blue channels experience Raman gain over a shorter distance. This can be dramatically improved if Raman pump laser 14 provides Red wavelength amplification signals and Raman pump laser 420 provides Blue wavelength amplification, for example.

In any of the aforementioned embodiments, Raman pump lasers 14 and 420 may comprise a plurality of pump lasers as required for a given amplification. Further, the number of directional wavelength selectors and sections of optical fibers will vary, so long as at least one directional wavelength selector is provided between two sections of optical fiber.

Thus, an optical fiber transmission system comprising of optical fiber with Raman amplification has been described according to the present invention. Improvements in long-haul optical signal transmission have been made at least partially by substantially removing back-scatter signals within an optical fiber. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. An apparatus for transporting an optical signal comprising:
   an optical fiber comprising first section and a second section of optical fiber;
   a directional wavelength selector positioned between said first section and said second section of optical fiber wherein said directional wavelength selector selectively blocks signal wavelengths propagating in a reverse direction;

a first pump light emitting device optically coupled to said first section of optical fiber that provides pump light the reverse direction; and a second pump light emitting device optically coupled to said second section of optical fiber that provides pump light in the reverse direction, wherein the pump light from the first and second pump light emitting devices are at different wavelengths and said second section receives different wavelength pump light than said first section.

2. The apparatus of claim 1, wherein each of the first and second pump light emitting devices comprises one of a pump laser and a light emitting diode (LED).

3. The app rams of claim 1, wherein each of the first and second pump light emitting devices provides an amplification signal for Raman amplification.

4. The app rams of claim 3, wherein the directional wavelength selector allows the amplification signal of the first pump light emitting device to propagate in the reverse direction.

5. The apparatus of claim 1, wherein the directional wavelength selector allows the optical signal to only propagate substantially in the forward direction.

6. The apparatus of claim 1, wherein the directional wavelength selector comprises an optical circulator.

7. The apparatus of claim 1, wherein the directional wavelength selector comprises a wavelength division multiplexer.

8. The app rams of claim 1, wherein at least one of the first and second sections of optical fiber comprises small effective area optical fiber.

9. The apparatus of claim 1, wherein the first section of optical fiber has a total length in the range of 5 to 25 km.

10. The apparatus of claim 1, wherein the pump light from the first pump light emitting device is at a longer wavelength than the pump light from the second pump light emitting device.

11. A method of transporting an optical signal comprising the steps of:

transporting an optical signal via an optical fiber comprising a first section and a second section of optical fiber;

providing a first amplification signal propagating in a reverse direction to amplify the optical signal using a first pump light emitting device optically coupled to said first section of optical fiber;

preventing pre-selected wavelengths of the optical signal from propagating in a reverse direction using a device positioned between said first section and second section of optical fiber, and providing a second amplification signal propagating in a reverse direction to amplify the optical signal using second pump light emitting device optically coupled to said second section of optical fiber, wherein the amplification signals from the first and second pump light emitting devices are at different wavelengths and said second section receives different wavelength amplification signals than said first section.

12. The method of claim 11, wherein each of the first and second pump light emitting devices comprises one of a pump laser and a light emitting diode (LED).

13. The method of claim 11, wherein the steps of providing first and second amplification signals comprise providing Raman amplification.

14. The method of claim 11, wherein the step of preventing pre-selected wavelengths from propagating in a reverse direction includes allowing the first amplification signal to propagate in the reverse direction.

15. The method of claim 11, wherein the step of preventing pre-selected wavelengths of the optical signal from propagating in a reverse direction includes allowing the optical signal wavelengths to only propagate substantially in the forward direction.

16. The method of claim 11, wherein the step of preventing pre-selected wavelengths of the optical signal from propagating in a reverse direction is performed by at least an optical circulator.

17. The method of claim 11, wherein the step of preventing pre-selected wavelengths of the optical signal from propagating in a reverse direction is performed by at least a wavelength division multiplexer.

18. The method of claim 11, wherein at least one of the first and second sections of optical fiber comprises small effective area optical fiber.

19. The method of claim 11, wherein the first section of optical fiber has a total length in the range of 5 to 25 km.

20. The method of claim 11, wherein the amplification signal from the first pump light emitting device is at a longer wavelength than the amplification signal from the second pump light emitting device.

21. A optical transmission system including optical fiber, the optical transmission system transmitting in a predetermined wavelength range, the system comprising:

a first section and a second section of optical fiber;

a directional wavelength elector positioned between said first and second section of optical fiber;

a first pump light emitting device optically coupled to said first section of optical fiber that provides pump light in he reverse direction; and a second pump light emitting device optically coupled to said second section of optical fiber that provides pump light in the reverse direction, wherein the pump light from the first and second pump light emitting devices are at different wavelengths and said second section receives different wavelength pump light than said first section, wherein said directional wavelength selector prevents pre-selected optical signal wavelengths from propagating in a reverse direction.

22. The system of claim 21, wherein each of the first and second pump light emitting devices comprises on of a pump laser and a light emitting diode (LED).

23. The system of claim 21, wherein each of the first and second pump light emitting devices provides an amplification signal for Raman amplification.

24. The system of claim 21, wherein the directional wavelength selector allows the amplification signal of he first pump light emitting device to propagate in the reverse direction.

25. The system of claim 21, wherein the directional wavelength selector allows the optical signal wavelengths to only propagate substantially in the forward direction.

26. The system of claim 21, wherein the directional wavelength selector comprises an optical circulator.

27. The system of claim 21, wherein the directional wavelength selector comprises a wavelength division multiplexer.

28. The system of claim 21 wherein at least one of the first and second sections of optical fiber comprises small effective area optical fiber.

29. The system of claim 21 wherein the first section of optical fiber has a total length in the range of 5 to 25 km.

30. The apparatus of claim 21, wherein the pump light from the first emitting device is at a longer wavelength than the pump light from the second pump light emitting device.

31. An optical transmission system including optical fiber, the optical transmission system transmitting optical signals in a predetermined wavelength range comprising:
   a first section and a second section of optical fiber wherein at least one of the first and second section of said optical fiber comprises small effective area optical fiber;
   a first pump light emitting device optically coupled to said first section of optical fiber that provides pump light in a reverse direction, wherein said first pump light emitting device provides an amplification signal along said optical fiber;
   a second pump light emitting device optically coupled to said second section of optical fiber that provides pump light in the reverse direction, wherein the pump light from the first and second pump light emitting devices are at different wavelengths and said second section receives different wavelength pump light than said first section; and
   a directional wavelength selector positioned between said first and second section of optical fiber wherein said directional wavelength selector allows said optical signals to only propagate substantially in the forward direction and allows said amplification signal to propagate in the reverse direction.

32. The apparatus of claim 31, wherein the pump light from the first pump light emitting device is at a longer wavelength than the pump light from the second pump light emitting device.

33. An apparatus for transporting an optical signal comprising:
   a first section and a second section of optical fiber;
   a first pump light emitting device optically coupled to said first section of optical fiber that provides pump light in a reverse direction, wherein said pump light emitting device provides an amplification signal along said optical fiber;
   a second pump light emitting device optically coupled to said second section of optical fiber that provides pump light in the reverse direction, wherein the pump light from the first and second pump light emitting devices are at different wavelengths and said second section receives different wavelength pump light than said first section; and
   an optical circulator positioned between said first and second section of optical fiber comprising at least three ports $T_x$, $R_x$, and $L_x$ wherein:
      signals entering port $R_x$ circulate to port $L_x$,
      signals entering port $L_x$ circulate to port $T_x$, and
      signals entering port $T_x$ circulate to port $R_x$; and
   a wave cancellation device positioned at said $L_x$ port of said optical circulator wherein said wave cancellation device reflects said amplification signal back into port $L_x$ and substantially does not reflect other signals emerging from port $L_x$.

34. The apparatus of claim 33, wherein the pump light from the first pump light emitting device is at a longer wavelength than the pump light from the second pump light emitting device.

35. A Raman optical signal amplifier comprising:
   an optical fiber comprising a first section of optical fiber and a second section of optical fiber;
   a directional wavelength selector positioned between said first and second sections of optical fiber wherein said directional wavelength selector allows signal wavelengths to propagate in a forward direction and selectively blocks wavelengths propagating in a reverse direction;
   a first Raman pump light emitting device optically coupled to said first section of optical fiber for generating a first amplification signal in the reverse direction; and
   a second Raman pump light emitting device optically coupled to said second section of optical fiber for generating a second amplification signal in the reverse direction, wherein the pump light from the first and second Raman pump light emitting devices are at different wavelengths and said second section receives different wavelength pump light than said first section,
   wherein said first section of optical fiber comprises optical fiber with an effective area less than 40 $\mu m^2$,
   wherein said second section of optical fiber comprises optical fiber with an effective area greater than 50 $\mu m^2$.

36. The apparatus of claim 35, wherein the pump light from the first Raman pump light emitting device is at a longer wavelength than the pump light from the second Raman pump light emitting device.

37. The amplifier of claim 35, wherein the directional wavelength selector comprises an optical circulator.

38. The amplifier of claim 35, wherein the directional wavelength selector includes a WDM coupler and an optical isolator.

39. The amplifier of claim 35, wherein the first and second amplification signals have a wavelength in the range of 1400 nm to 1480 nm.

40. The amplifier of claim 35, wherein optical signal wavelengths are in the range of 1530 nm to 1620 nm.

* * * * *